United States Patent [19]

Miller, Jr.

[11] Patent Number: 4,660,609

[45] Date of Patent: Apr. 28, 1987

[54] PLANER HAVING REMOVABLE HEAD

[75] Inventor: John E. Miller, Jr., Kansas City, Mo.

[73] Assignee: Woodmaster Tools, Inc., Kansas City, Mo.

[21] Appl. No.: 895,243

[22] Filed: Aug. 11, 1986

Related U.S. Application Data

[63] Continuation-in-part of Ser. No. 799,305, Nov. 18, 1985, abandoned.

[51] Int. Cl.[4] .............................................. B27C 1/02
[52] U.S. Cl. .............................. 144/117 R; 51/72 R; 144/114 R; 403/334; 403/361
[58] Field of Search ................. 403/334, 361; 30/475, 30/476, 477; 144/114 R, 117 R; 51/72 R, 74 R, 78

[56] References Cited

U.S. PATENT DOCUMENTS

| | | | |
|---|---|---|---|
| 2,750,610 | 6/1956 | Bloch | 51/72 R |
| 3,718,168 | 2/1973 | Berends | 144/117 R |
| 4,394,878 | 7/1983 | Rice et al. | 144/117 R |
| 4,428,131 | 1/1984 | Hahn | 403/334 |

*Primary Examiner*—W. D. Bray
*Attorney, Agent, or Firm*—Schmidt, Johnson, Hovey & Williams

[57] ABSTRACT

A woodworking machine which has a driven woodworking head in the form of a sanding drum, planer head or molding head, the head being supported between a pair of spaced walls and a pair of bearings by a pair of Morse taper plugs, which are received respectively in the opposite ends of the head and which are driven whereby to drive the head, the plugs being removable from the head by shifting the same, when loosened, in longitudinal alignment with the head, whereby the head may be removed from the machine by lifting the same directly upwardly between the walls.

7 Claims, 4 Drawing Figures

PLANER HAVING REMOVABLE HEAD

This application is a continuation in part of Ser. No. 799,305, filed Nov. 18, 1985, now abandoned.

BACKGROUND OF THE INVENTION

1. Field of the Invention

The present invention relates to a woodworking machine in the nature of a combination sander, planer, and molder wherein the planer head or drum is held in place by a pair of Morse taper plugs which, when released and withdrawn longitudinally from their position seated within the head permit removal of the planar head without removal or other movement of either of the bearings which support the planer head.

2. Summary of the Invention

The planer having a removable head as described herein may take the form of a machine which is used for woodworking and which may also be used for sanding or may be used with a molding head, which heads are interchangeable by virtue of the structure disclosed and described herein.

The removable drum assembly forming the subject matter of this invention is an improvement over the "Combination Planer, Molder" of U.S. Letters Patent No. 4,394,878, issued July 26, 1983, such patent being incorporated herein by reference as might be necessary or desirable for a full and complete understanding of the present machine and its improvements.

In the woodworking machine disclosed in the aforementioned patent, there is provided a cylinder for planing a workpiece which has its driven shaft supported by a pair of bearings, one of which bearings is pivotal. To remove the shaft, the rigidly mounted bearing must first be entirely released to permit upward swinging movement of the shaft and the drum, which is possible through the utilization of the pivotally mounted bearing as illustrated for instance in FIGS. 4 and 5 of the drawing of said patent. In order to accomplish removal of the drum, it is necessary that the side frame of the machine be slotted whereby the drum and its attendant shaft and associated components may be free to swing upwardly about the pivotal connection between the shaft and one of the bearings. The procedure is difficult and time-consuming and results in movement of the bearings each time the drum is to be changed as between a planer and a molder. Furthermore, the cost of a pivotal bearing is unnecessary as is the weakening of the supporting frame walls of the machine, given the high speeds utilized when the machine is operated.

Accordingly, and to eliminate the aforementioned problem, the present planer head is supported in such a manner that it may be removed without disturbing the bearings which carry the head. Furthermore, the changing of the heads, as between a sander, a planer and a molder may be rapidly accomplished without significant movement of the bearings and particularly without tilting or pivotal movement thereof when the planer head is removed since it is merely shifted directly upwardly. Further, it is not necessary to provide the frame walls of the machine with slots or openings, thereby giving greater strength and rigidity to the frame partcularly adjacent the mounting point for the bearings for the head whereby to aid in the overall operation and durability of the machine.

To this end, the planer head is supported, at each end, by a Morse taper plug, which plugs are each complementally received by a socket formed in the head whereby, when it is desired to change heads, a bolt may be merely loosened, each of the Morse taper plugs shifted longitudinally out of its corresponding socket in the head, whereby to free the head for upward movement between the walls of the frame and subsequent positioning of a new head. The new head may have comparable sockets to the initial and thus the Morse taper plugs might be utilized to mount the new head whether it be a planer, a sander or a molding head, all to the end that the machine may be readily converted from a sander to a molder to a planer, as desired by the operator thereof and within very short time frames.

IN THE DRAWINGS

DESCRIPTION OF THE PREFERRED EMBODIMENT

Figure 1:
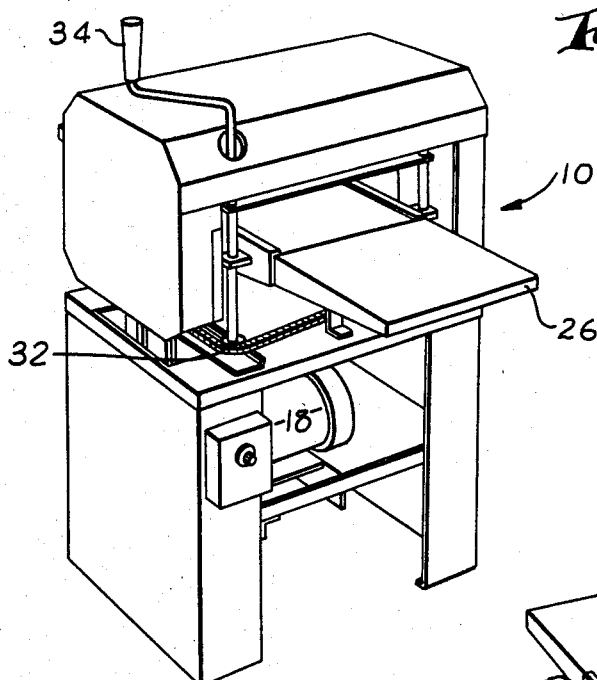
FIG. 1 is a perspective view of a machine made according to the present invention.

As indicated above, the machine 10, chosen for illustration in the drawings, may, for the most part, be substantially the same as the combination machine disclosed in U.S. Pat. No. 4,394,878 except only for the means of mounting the head and as is particularly depicted in FIG. 4 of the drawing.

While a planer has been chosen for purposes of illustration in the drawing and description in this specification, it will be appreciated that the machine may be in the form of a sanding machine, a planing machine, or a molding machine, depending upon the exact nature of woodworking which is to be accomplished by the single machine. To this end there is provided a head 12 which, as illustrated, is in the general nature of a planing drum having a plurality of knives, which drum or head may be readily interchanged, as hereinafter described, with a drum which would perform a sanding function or a drum which would perform a molding function in woodworking.

In the illustrated embodiment, the head 12 is disposed between a pair of rollers 16 (one shown) whose function is to advance a workpiece (not shown) through the machine 10, it being understood that the head 12 and the rollers 16 are driven by a common motor such as 18.

The head 12 is operably coupled with the motor 18 through belt and pulley means 20. One of the rollers 16 is driven by belt and pulley means 20 whereby operation of the motor 18 will simultaneously drive the head 12 and each of the rollers 16.

The workpiece to be sanded, planed or upon which a molding operation is to be performed, is supported beneath the head 12 and the roller 16 by a supporting bed 26, which bed is capable of being raised and lowered by actuation of four screws 30, which are interconnected by a chain and sprocket wheel assembly 32. One of the screws 30 is provided with a handle 34 for manual actuation of the raising and lowering mechanism whereby to position the workpiece exactly as desired with respect to the head 12.

The head 12 includes a plurality of planer knives 36 which extend longitudinally thereof as illustrated and are suitably secured to the drum 12.

Drum 12 is mounted between a pair of opposed frame walls 40, each of which has an opening 42 therein whereby to permit alignment of the drum 12 with corresponding bearings 44 which are rigid to the walls 40 in aligned relationship with the openings 42.

The drum 12 is provided, at each end thereof, with a socket 46, such sockets 46 each being inwardly tapered from the outer ends 48 of the drum 12 whereby to present a conical configuration, as illustrated, there being a cylindrical seat 50, at the inner end of each of the conical configurations of the socket 46 and a tapped hole 52 extending inwardly into the drum 12 from each of the cylindrical seats 50, respectively.

Figure 2:
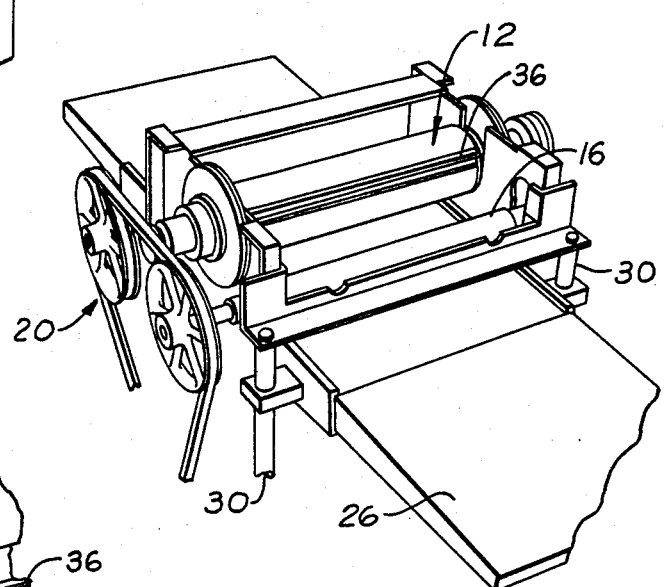
FIG. 2 is a fragmentary perspective of the machine with the cover removed.
Figure 3:
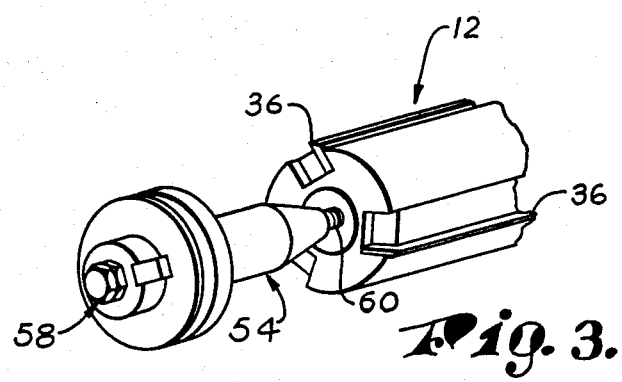
FIG. 3 is a fragmentary perspective view of one end of the head with the Morse taper plug removed therefrom.

Each of the sockets 46 and its associated seat and tapped hole receives a corresponding, mating Morse taper plug, one of the plugs 54, at one end of the drum 12 having the pulley assembly 20 connected thereto as illustrated in FIGS. 2 and 3, the other Morse tapered plug 56 being received at the other end of the drum 12.

Figure 4:
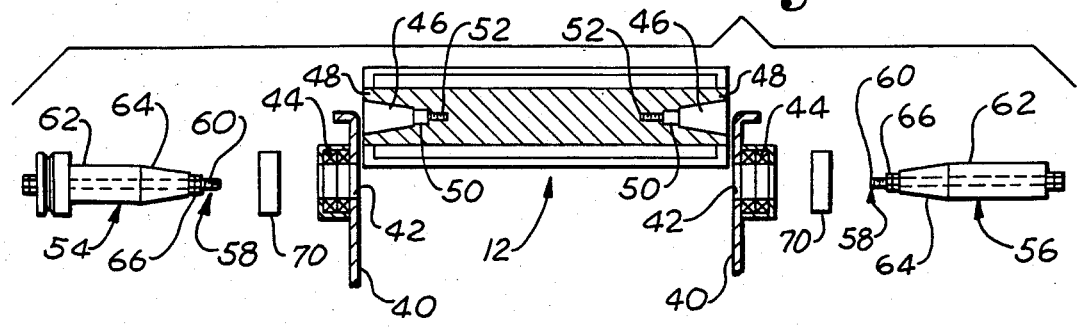
FIG. 4 is an exploded, elevational view showing the manner in which the head is mounted in the machine.

A bolt, such as 58 extends longitudinally of each of the Morse taper plugs 54 and 56, the bolts each having its head end disposed at the flat end of the Morse taper plug 54 and 56, respectively, and its threaded end 60 disposed at the conical end of the plugs 54 and 56, as best illustrated in FIG. 4 of the drawing.

Each of the plugs 54, 56, has a generally cylindrical shank portion 62; a conical portion 64; and a cylindrical seat portion 66, the threaded end 60 of the bolt 58 extending outwardly from the cylindrical portions 66, respectively.

It will be appreciated that the taper on conical portion 64 of each of the plugs 54, 56 is identical to the taper of the conical seats 46 formed in the drum 12 whereby the conical plug portion and the conical seat portion may be exactly mated to create a friction tight fit therebetween when the plugs 54 and 56 are inserted into the opposite ends of the drum 12 respectively.

Once such an insertion has been made and the plug 54 and the plug 56 are each seated within their corresponding conical sockets 46, the bolts 58 are tightened whereby to cause ends 60 thereof to engage the threads of the tapped holes 52 and thereby draw the plugs 54 and 56 inwardly, thereby tightening the frictional engagement between the conical portions 64 and their corresponding sockets 56, all to the end that the drum 12 will be tightly retained in position between the two plugs 54 and 56. One of the bolts has left hand threads and the other has right hand threads so that when the plugs 54, 56 are inserted in drum 12 and the machine operated, the bolts will be tightened. The shank portions 62 of the plugs are received by the bearings 44 whereby upon the driving of the belt and pulley assembly such as 20, the drum will be rotated.

To prohibit lateral movement of the drum 12 during rotation, a set collar 70 is provided at each end in surrounding relationship to the shank portions 62 of each of the plugs 54 and 56.

As is apparent, the provision of the Morse taper plugs makes it possible to virtually instantly change the head drum 12, since all that is necessary is to loosen the bolts 58 in each of the plugs 54 and 56 and thereby disengage the threaded ends 60 thereof from the tapped holes 52, thereby permitting withdrawal of the plugs 54 and 56 by moving the same in axial alignment outwardly from the head 12. Once this has been accomplished, the head 12 is free and may be moved straight upwardly between the wall frames 40 to thereby remove the head from the machine.

The next head, as desired, may be placed in the machine either by moving the same downwardly between the walls 40 into alignment with the openings 42 and then replacing the plugs 54 and 56 through the openings 42 and into their corresponding sockets 46; tightening the bolts 58 and coupling the appropriate belts with their corresponding pulleys or by utilizing the interchanging assembly disclosed in my abovementioned copending application.

Thus, there is presented a woodworking machine which has a planer head and in which the heads are quickly interchangeable from one working operation to another such as between a sanding drum, a planing head or a molding head whereby a single machine is given great versatility by virtue of the interchangeable nature of the head which performs the woodworking function in the manner hereinabove described.

I claim:

1. In a woodworking machine,
   an elongated, driven woodworking head;
   a pair of spaced apart, fixed bearings rotatably supporting the head;
   a pair of Morse taper plugs coupling the head with said bearings, said plugs being received by corresponding sockets formed in the head.

2. The invention of claim 1, said plugs each having a conical portion and a shank portion, the conical portions each being received within a corresponding socket formed in an end of the head, whereby the head is supported between said plugs.

3. The invention as set forth in claim 2, there being means coupled with the shank portion of one of said plugs for driving the same and thereby driving the head when the plug is inserted in the head.

4. The invention as set forth in claim 3, there being means for securing the plugs within their corresponding sockets in the head.

5. The invention as set forth in claim 4, said means for securing the plugs being in the form of a bolt extending through the plug and into a threaded hole in the head whereby said bolts may be tightened to secure the plugs within the head and loosened to remove the plugs from the head.

6. The invention as set forth in claim 5, there being a pair of spaced upstanding walls between the bearings, said plugs each extending through a corresponding wall and into the head, the head being disposed between said walls.

7. The invention as set forth in claim 6, the plugs being removable from the head by shifting the same in longitudinal alignment therewith, whereby the head may be removed from the machine by lifting the same upwardly between said walls.

* * * * *